United States Patent
Zhang et al.

(10) Patent No.: US 9,900,236 B2
(45) Date of Patent: Feb. 20, 2018

(54) PLUG-AND-PLAY NETWORK FILTER

(71) Applicant: Circle Media Inc., Portland, OR (US)

(72) Inventors: Tiebing Zhang, Cypress, CA (US);
Yufeng Tu, Cypress, CA (US)

(73) Assignee: Circle Media Labs Inc., Portland, OR (US)

( * ) Notice: Subject to any disclaimer, the term of this patent is extended or adjusted under 35 U.S.C. 154(b) by 0 days.

(21) Appl. No.: 15/483,727

(22) Filed: Apr. 10, 2017

(65) Prior Publication Data

US 2017/0214597 A1 Jul. 27, 2017

Related U.S. Application Data

(62) Division of application No. 13/030,050, filed on Feb. 17, 2011, now Pat. No. 9,634,896.

(51) Int. Cl.

| H04L 29/06 | (2006.01) |
| H04L 12/26 | (2006.01) |
| H04L 29/12 | (2006.01) |
| H04L 12/721 | (2013.01) |
| H04L 12/58 | (2006.01) |

(52) U.S. Cl.
CPC ............ *H04L 43/12* (2013.01); *H04L 43/028* (2013.01); *H04L 43/0811* (2013.01); *H04L 45/70* (2013.01); *H04L 61/103* (2013.01); *H04L 63/0281* (2013.01); *H04L 63/101* (2013.01); *H04L 51/12* (2013.01); *H04L 61/1511* (2013.01); *H04L 61/6022* (2013.01)

(58) Field of Classification Search
CPC ....... H04L 43/12; H04L 61/103; H04L 45/70; H04L 43/0811; H04L 63/0281; H04L 63/101; H04L 43/028; H04L 61/6022; H04L 51/12; H04L 61/1511
See application file for complete search history.

(56) References Cited

U.S. PATENT DOCUMENTS

| 5,963,540 | A | 10/1999 | Bhaskaran |
| 6,912,223 | B1 | 6/2005 | Sloane |
| 7,567,573 | B2 | 7/2009 | Foss |
| 7,849,502 | B1 | 12/2010 | Bloch et al. |
| 7,904,518 | B2 | 3/2011 | Marino et al. |
| 8,301,753 | B1 | 10/2012 | Melvin |
| 2003/0074466 | A1 | 4/2003 | Hughes et al. |

(Continued)

*Primary Examiner* — Lisa Lewis
*Assistant Examiner* — Christopher C Harris
(74) *Attorney, Agent, or Firm* — DASCENZO Intellectual Property Law, P.C.

(57) ABSTRACT

A method of filtering outbound Internet traffic includes connecting an appliance to a network (that includes an end user terminal and a router), altering the flow of network traffic to direct the end user terminal to route outbound Internet traffic through the appliance, and filtering the outbound Internet traffic with the appliance. The outbound Internet traffic is traffic to remote servers from the end user terminal. The appliance may alter the flow of network traffic by issuing a gratuitous ARP packet from the appliance to direct the end user terminal to route the outbound Internet traffic through the appliance instead of the router. The appliance may receive the outbound Internet traffic to remote servers from the end user terminal, monitor the outbound Internet traffic, filter the outbound Internet traffic to form allowed packets for the remote servers, and/or forward the allowed packets to the remote servers.

20 Claims, 8 Drawing Sheets

100 eSafeKids device ARP Spoof the real router/gateway with gratuitous ARP Packets
200 User computer sends outgoing packets to eSafeKids router, thinking it is the real router
300 eSafeKids device process web and IM logging and blocking
400 eSafeKids device forwards allowed packets to the real router
500 eSafeKids device uploads and reports to eSafeKids Server on the Internet
600 eSafeKids server pushes down configuration and firmware updates when necessary

(56) References Cited

U.S. PATENT DOCUMENTS

| | | |
|---|---|---|
| 2003/0140283 A1 | 7/2003 | Nishio |
| 2006/0026304 A1 | 2/2006 | Price |
| 2006/0050703 A1 | 3/2006 | Foss |
| 2006/0150240 A1 | 7/2006 | Robinson et al. |
| 2008/0046879 A1 | 2/2008 | Hostetler et al. |
| 2008/0081580 A1 | 4/2008 | Cole |
| 2008/0127295 A1 | 5/2008 | Pirzada et al. |
| 2010/0332212 A1 | 12/2010 | Finkelman |
| 2012/0023593 A1 | 1/2012 | Puder et al. |

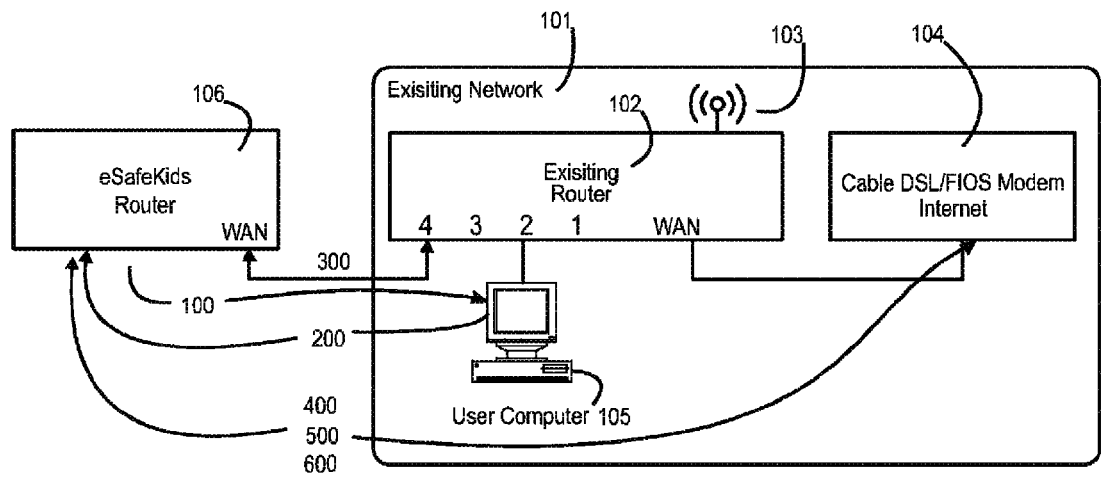

100  eSafeKids device ARP Spoof the real router/gateway with gratuitous ARP Packets
200  User computer sends outgoing packets to eSafeKids router, thinking it is the real router
300  eSafeKids device process web and IM logging and blocking
400  eSafeKids device forwards allowed packets to the real router
500  eSafeKids device uploads and reports to eSafeKids Server on the Internet
600  eSafeKids server pushes down configuration and firmware updates when necessary

*Fig. 1*

| File Edit View History Bookmark Tools Help | | |
|---|---|---|
| eSafeKids: Today's List | 301 302 303 | |
| MY ACCOUNT | List of websites visited today | |
| ➡ Account Info | 12:06:00 12:06:03 | 67.20.78.117 🔒 From XPC |
| | 12:05:30 12:05:40 | 67.20.78.117 🔒 From XPC |
| ➡ Settings | 12:05:00 12:05:23 | 67.20.78.117 🔒 From XPC |
| ➡ Blocklist | 12:05:50 | www.venger.com From XPC — 304 |
| | 12:05:30 12:05:46 | login.dotomi.com From XPC |
| ➡ Whilelist | 12:05:44 | www.venger.com From XPC |
| WEB MONITOR | 12:05:16 | clients1.google.com From XPC |
| | 12:05:16 | www.venger.com From XPC |
| ➡ Active Computers | 12:05:00 12:05:15 | www.google.com From XPC |
| | 12:05:14 | suggestqueries.google.com From XPC |
| ➡ Real-time monitoring | 12:04:30 12:04:55 | 207.46.21.124 🔒 From KOBE |
| | 12:03:30 12:03:56 | 67.20.78.117 🔒 From XPC |
| ➡ Today's Summary | 12:04:30 12:04:50 | download.windowsupdate.com From KOBE |
| | 12:04:00 12:04:03 | download.windowsupdate.com From KOBE |
| ➡ Search Keywords | 12:03:30 12:03:44 | esafekids.com From XPC |
| ➡ Blocked Website Visits | 12:03:00 12:03:22 | download.windowsupdate.com From |
| | 12:01:30 12:01:32 | 66.211.169.2 🔒 From XPC |
| IM MONITOR | 12:01:00 12:01:24 | 67.20.78.117 🔒 From XPC |
| | 12:01:03 | suggestqueries.google.com From XPC |
| ➡ IM Monitoring | 12:00:30 12:00:50 | login.yahoo.com 🔒 From XPC |
| | 11:58:00 11:58:04 | suggestqueries.google.com From XPC |
| LOGOUT | 11:57:30 11:57:30 | 67.20.78.117 🔒From XPC |
| ➡ Logout | 11:56:59 | login.yahoo.com 🔒From XPC |
| | 11:56:59 | edit.yahoo.com 🔒 From XPC |
| | 11:56:59 | us.bc.yahoo.com 🔒 From XPC |
| | 11:56:59 | edit.yahoo.com 🔒 From XPC |
| | 11:56:59 | ad.doubleclick.net 🔒 From XPC |
| | 11:56:30 11:56:59 | a248.e.akamai.net 🔒 From XPC |
| | 11:56:59 | edit.yahoo.com 🔒 From XPC |
| | 11:56:58 | login.yahoo.com 🔒 From XPC |
| | 11:56:58 | login.yahoo.net 🔒 From XPC |
| | 11:56:58 | login.yahoo.com 🔒 From XPC |
| | 11:56:58 | s.yimg.com🔒From XPC |
| | 11:56:58 | login.yahoo.com 🔒 From XPC |
| | 11:57:40 | www.google.com From XPC |
| | 11:57:30 11:57:39 | clients1.google.com From XPC |
| | 11:57:39 | www.google.com From XPC |
| | 11:57:00 11:57:24 | www.google.com From XPC |
| | 11:56:30 11:56:57 | mail.yahoo.com From XPC |
| | 11:53:00 11:53:01 | 67.20.78.117 🔒From XPC |
| | 11:50:00 11:50:23 | 67.20.78.117 🔒From XPC |
| | 11:50:09 | 67.20.78.117 🔒From XPC |
| | 11:49:00 11:49:26 | 67.20.78.117 🔒From XPC |

*Fig. 3* eSafeKids: Today's Summary

| | Top websites visited today | |
|---|---|---|
| MY ACCOUNT | Number of | |
| ▶ Account Info | Visits  Website | |
| ▶ Settings | | |
| ▶ Blocklist | 10  67.20.78.117 | Block |
| ▶ Whilelist | 8  download.windowsupdate.com | Block |
| WEB MONITOR | 4  login.yahoo.com | Block |
| ▶ Active Computers | 3  view.atdmt.com | Block |
| ▶ Real-time monitoring | 3  www.google.com | Block |
| ▶ Today's Summary | 2  edit.yahoo.com | Block |
| ▶ Search Keywords | 2  Www.venger.com | Block |
| ▶ Blocked Website Visits | 2  static.foxsports.com | Block |
| IM MONITOR | 2  udc.msn.com | Block |
| ▶ IM Monitoring | 2  msn.foxsports.com | Block |
| LOGOUT | 2  rad.msn.com | Block |
| ▶ Logout | 2  suggestqueries.google.com | Block |
| | 1  rel.msn.com | Block |
| | 1  c.foxsports.com | Block |
| | 1  c.atdmt.com | Block |
| | 1  ad.doubleclick.net | Block |
| | 1  clients1.google.com | Block |
| | 1  www.msn.com | Block |
| | 1  b.rad.msn.com | Block |
| | 1  b.scorecardresearch.com | Block |
| | 0  a.rad.msn.com | Block |
| | 0  mm.bing.net | Block |
| | 0  cdn.gigya.com | Block |
| | 0  www.bing.com | Block |
| | 0  c.msn.com | Block |
| | 0  api.bing.com | Block |
| | 0  g.msn.com | Block |
| | 0  spe.atdmt.com | Block |

*Fig. 4*

| MY ACCOUNT | Welcome FIRSTNAME LASTNAME |
|---|---|
| ➡ Account Info | |
| ➡ Settings | Username: tzhang |
| ➡ Blocklist | |
| ➡ Whitelist | First Name: FIRSTNAME |
| WEB MONITOR | Last Name: LASTNAME |
| ➡ Active Computers | |
| ➡ Real-time monitoring | Email: tiebingzhang@gmail.com |
| ➡ Today's Summary | Device ID: 0q14w161fx8f |
| ➡ Search Keywords | |
| ➡ Blocked Website Visits | |
| IM MONITOR | Edit |
| ➡ IM Monitoring | |
| LOGOUT | |
| ➡ Logout | |

*Fig. 7*

PLUG-AND-PLAY NETWORK FILTER

RELATED APPLICATION

This application claims priority to U.S. patent application Ser. No. 13/030,050, which was filed on Feb. 17, 2011, and entitled "PLUG-AND-PLAY NETWORK FILTER," the complete disclosure of which is incorporated by reference.

FIELD OF THE INVENTION

The present invention is in the field of network filter appliances.

DISCUSSION OF RELATED ART

Controlling access to the Internet is a concern of many parents today, but many parents do not have the technical capability to filter the Internet. What is needed is a plug-and-play network filter which does not require network engineering sophistication. Although there are a variety of browser-based and software-based filters, these do not address the situation where a new device is connected to the network.

A variety of network management systems have developed for allowing greater control of a network. For example, in United States patent publication 2006/0150240 published on Jul. 6, 2006 to Mr. Robinson and Mr. Ebert, the disclosure of which is incorporated herein by reference, the inventors describe presents a method of network management, enabling a user to control access through a router. The user has the ability to discover and select other users and applications within his/her network.

Other variety of network systems have been devised for managing network traffic. For example, in U.S. Pat. No. 7,567,573 B2 issued Jul. 28, 2009, issued to inventor Mr. Andrew Foss, the disclosure of which is incorporated herein by reference, the patent discloses in the abstract:

A technique for connecting New Network Devices (NNDs) to an existing communication network. The NND caches the MAC address of an Original (or "Old") Network Device, then gratuitously transmits Address Resolution Protocol (ARP) responses on behalf of the OND, but pointing to its own MAC address. This, in effect, allows the NND to insert itself in the path of packets originally destined for the OND. After performing its designated operations such as filtering, compression, caching, file serving, virus scanning, etc. . . . any remaining packets can still be forwarded to the OND for further processing. In this event, the packets are forwarded by the NND to the OND as MAC layer frames using the OND's MAC address only and not its IP address. In the event that the NND fails, no special steps need to be taken, as the OND will eventually receive traffic again as it responds to further ARP requests.

SUMMARY OF THE INVENTION

A method of filtering outbound Internet traffic includes connecting an appliance to a network (that includes an end user terminal and a router), altering the flow of network traffic to direct the end user terminal to route outbound Internet traffic through the appliance, and filtering the outbound Internet traffic with the appliance. The outbound Internet traffic is traffic to remote servers from the end user terminal. Connecting the appliance to the network is by forming a connection across a physical medium such as a wired or wireless connection (e.g., a physical layer connection rather than merely a MAC layer connection or merely a logical connection).

The appliance may alter the flow of network traffic by issuing a gratuitous ARP packet from the appliance. The alteration of network traffic flow and the gratuitous ARP packet may be performed by the appliance in response to the physical connection (wired or wireless) to the network. The alteration of the network traffic flow directs the end user terminal to route the outbound Internet traffic through the appliance instead of the router. For example, the appliance may establish itself between the router and end user terminal. The appliance may receive the outbound Internet traffic to remote servers from the end user terminal, monitor the outbound Internet traffic, filter the outbound Internet traffic to form allowed packets for the remote servers, and/or forward the allowed packets to the remote servers.

BRIEF DESCRIPTION OF THE DRAWINGS

FIG. 1 is a network diagram of the network topology.

FIG. 3 is a sample screenshot of the list of websites visited.

FIG. 4 is a sample screenshot of list of the top websites visited today.

FIG. 7 is a sample screenshot of the account information page.

Figure 2:
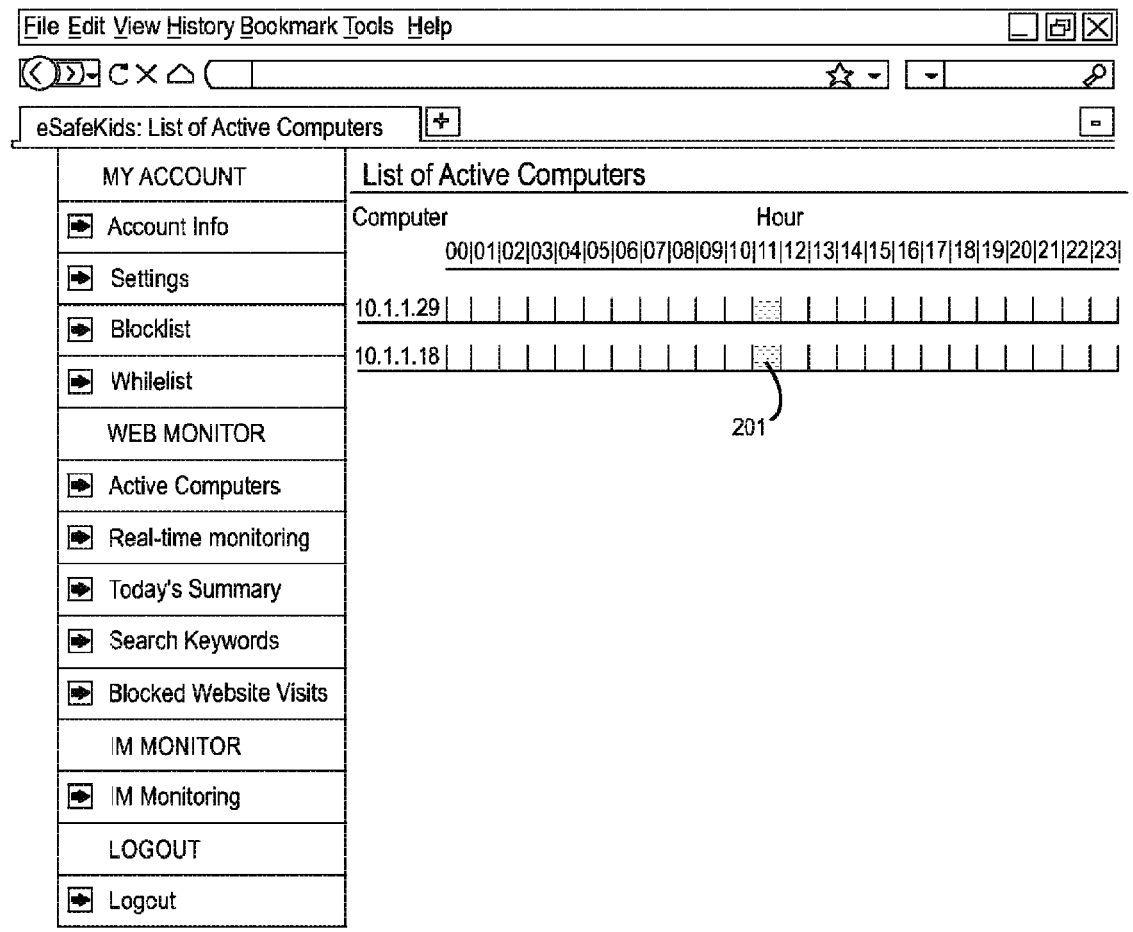
FIG. 2 is a sample screenshot of the list of active computers.

The following call out list of elements can be a useful guide for referencing the elements of the drawings.
100 ARP Spoof
101 Existing Network
102 Existing Router
103 Wireless Connection
104 Existing Modem
105 Existing User Computer
106 Appliance
200 Outgoing Packets
201 Activity Indicator
300 Logging And Blocking
301 Starting Time
302 Ending Time
303 Website Visited Name
304 Name Of Computer Used
400 Forwarding Allowed Packets
500 Uploading And Reporting To Server
600 Server Push Down Configuration And Firmware Update
601 Blocked Websites

DETAILED DESCRIPTION OF THE PREFERRED EMBODIMENT

The present invention may have a physical embodiment that looks like a regular network appliance box and preferably will have an external power cable from direct current to household electric current via a transformer. The present invention preferably also has an RJ45 cable for Ethernet connection to a network. Inside the housing is a circuit board with a plurality of electronic components mounted thereon. The physical embodiment is therefore ordinary and can be of currently available standard network devices such as a programmable router that can have its firmware reprogrammed for repurposing as a plug-and-play network filter. The physical embodiment may also be a small key appearing as a small USB key that can plug into an Ethernet socket such as on a router or switch.

The appliance is designed so that preferably a user may purchase the device at a retail store without any technical hardware configuration required. The user then takes the power cord and plugs it into household electric current. The user also makes the Ethernet connection. After these initial steps, it is preferred that the remainder of the process can be automated.

When the filter device appliance is plugged into the network, it alters the flow of network traffic. The device changes the address resolution protocol ARP so that it assumes the role of the router. When the device is plugged into the network, the device issues an ARP packet (the ARP packet can be an ARP-RESPONSE packet or an ARP-REQUEST packet) with the network gateway's IP address and its own MAC address. This packet is sent across the network which is received at terminals and workstations. This packet is called gratuitous ARP and is spoofed so could be called a spoofed gratuitous ARP. When referring to ARP packets 'Gratuitous' means unsolicited and 'Spoofed' means not the actual address.

Optionally, when the IP address of the ARP-RESPONSE packet being sent is not the device's own IP address, it's called ARP Spoofing. The device sends the ARP-RESPONSE packet which can be on regular intervals such as about once every second and in the best mode more frequently than once every minute. In addition, the device responds to any ARP Request on the Gateway IP address. Instead of sending an ARP-RESPONSE packet an ARP-REQUEST packet can be sent which would have substantially similar effect.

The appliance then activates IP Routing so that all incoming packets are eventually routed correctly to the real gateway. The above steps cause all computers on the network (wired and wireless) to send outbound packets to the filter appliance instead of to the router. The appliance receives the outbound packets from the computers and routes the packets to the router or routers. This allows the filter appliance to log, and otherwise manipulate packets.

The filter appliance now filters Internet traffic and logs and blocks certain predefined types of traffic. The filter appliance transparently proxies web packets (TCP with destination port 80 and 443) where web access is logged. The filter appliance also enforces Blacklist/whitelist domains and URLs. The filter appliance transparently proxies IM packets (with designated TCP ports) to port 16667, where a IM proxy is used to log all activity and filter words/accounts. The filter appliance also transparently logs all other TCP activities, including remote server's IP address, Domain Name and port number. The filter appliance transparently proxies all DNS queries to a local DNS proxy, and records all DNS queries so that other process can translate IP addresses back to domain names, and domain name filtering can be processed.

The filter appliance is connected to the World Wide Web. When the filter appliance powers up, it gets an IP address from the router, and goes to the Internet to download its firmware to RAM and the run the firmware. The filter appliance communicates with a server and is configured to upload log information to the server, and download firmware updates. The server will have a subscription to block website list services and the server may send the block website list updates by firmware updates to the filter appliance.

Every so often (such as every minute), the filter appliance device pings the server and fetches a script to run. All logs are uploaded to the web periodically. User configuration update is pushed down to device automatically. Firmware update is pushed down to device automatically. If a new firmware is available, the filter appliance device will reboot so that it can run the latest firmware. The reboot is graceful to the network, i.e. it will not cause any current network connection to be disconnected. This is done by the filter appliance sending back the correct MAC address of the network gateway by ARP Response before it reboots.

FIG. 1 is a network diagram of the network topology. The existing network 101 has an existing router 102. The existing router may have a wireless connection 103 built in. The existing router may be connected to a modem such as a cable or DSL/FOIS modem. The existing user computer 105 is connected to one of the sockets on the router which has a switch built in. The appliance 106 can be called by a proposed trademark such as eSafeKids and maybe in the form of a router which has been programmed and configured to be used as a plug-and-play network filter appliance.

After a user plugs in the appliance 106, the appliance sends an ARP spoof 100 of the real or existing router 102 with preferably gratuitous ARP packets. The user computer then sends outgoing packets 200 to the appliance thinking it is the real or existing router 102. The appliance processes Web and IM instant messaging logging and blocking functions 300. The appliance further forwards allowed packets 400 to the real router. The appliance also uploads and reports 500 to a central server on the Internet. The central server may then push down configuration and firmware updates 600 when necessary.

If the appliance 106 is a firmware programmable router, the WAN port of the firmware programmable router is preferably plugged into a port such as port number four of the existing router. The existing router has a WAN port that is plugged into the modem. The modem then connects to the Internet.

In the absence of a specific user configuration through the server of the appliance, the appliance will remain in a default mode. In the default mode, the appliance will block dangerous or undesirable websites based upon a list provided to it from the server or preconfigured on its firmware. The device may further renew or update the list of undesirable websites based on a list provided to it from the server. Optionally, user configuration of the user account to control the appliance through the server provides additional functionality for logging, monitoring and custom configuring a block list or white list. Users may be authenticated with the central server through a password is for logging in to user accounts maintained on the central server.

FIG. 2 is a sample screenshot of the list of active computers. An activity indicator 201 can be a shaded portion of a bar graph showing time where a computer was active. The proposed interface is on a browser accessed through the central server where the central server receives data from the appliance 106. The data can be displayed on a menu navigation which includes information related to account information, settings, block list, white list. The menu navigation may further include information such as active computers, real-time monitoring, today's summary, search keywords, block website visits. The menu navigation may further include an instant message monitoring system. Further more the menu navigation may include a logout button.

FIG. 3 is a sample screenshot of the list of websites visited. The central server may generate a list of websites visited today including the starting time 301, the ending time 302, the website visited name, and the name of the computer used 304. The list may be brought up by the user when the user clicks on a button such as the real-time monitoring button on the menu navigation. The list of websites visited can be taken from the central server which that retains the data for a limited amount of time after receiving the data of the list of websites visited today from the appliance 106 which uploads the data to the central server.

FIG. 4 is a sample screenshot of list of the top websites visited today. The top websites visited can be accessed through one of the buttons including the today's summary. Here, the top websites visited are ranked in order of the number of visits to each of the websites. Next to each of the websites is an option to block the website. If a user clicks on the block button, the website will be added to the block website list which is pushed down to the appliance 106 from the server. All of the screenshots are screenshots of the user accessing the central server through the Internet.

Figure 5:
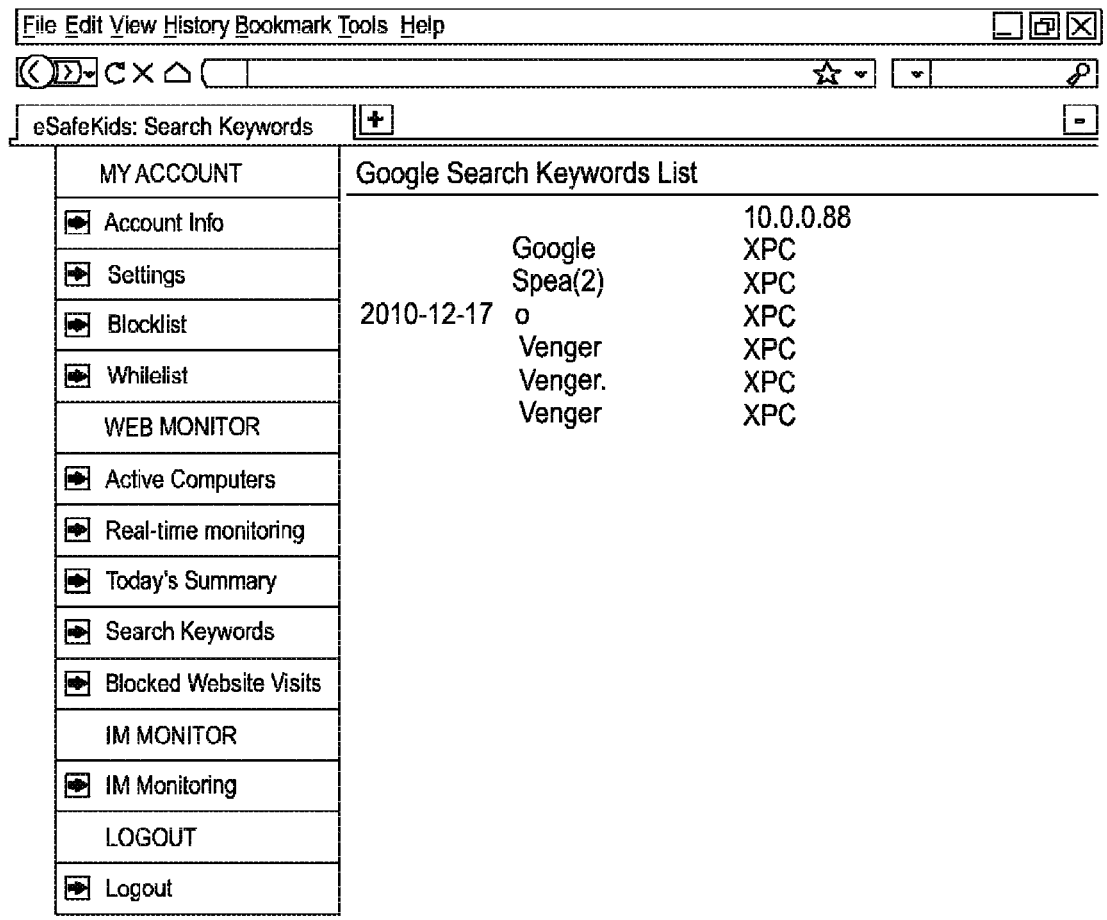
FIG. 5 is a sample screenshot of list of keyword search conducted.

FIG. 5 is a sample screenshot of list of keyword search conducted. The search keywords list can also be used for determining when a user is searching for. The searches may include a variety of different topics. The search keywords button on the menu navigation can access data stored on a central server which is received from the appliance 106.

Figure 6:
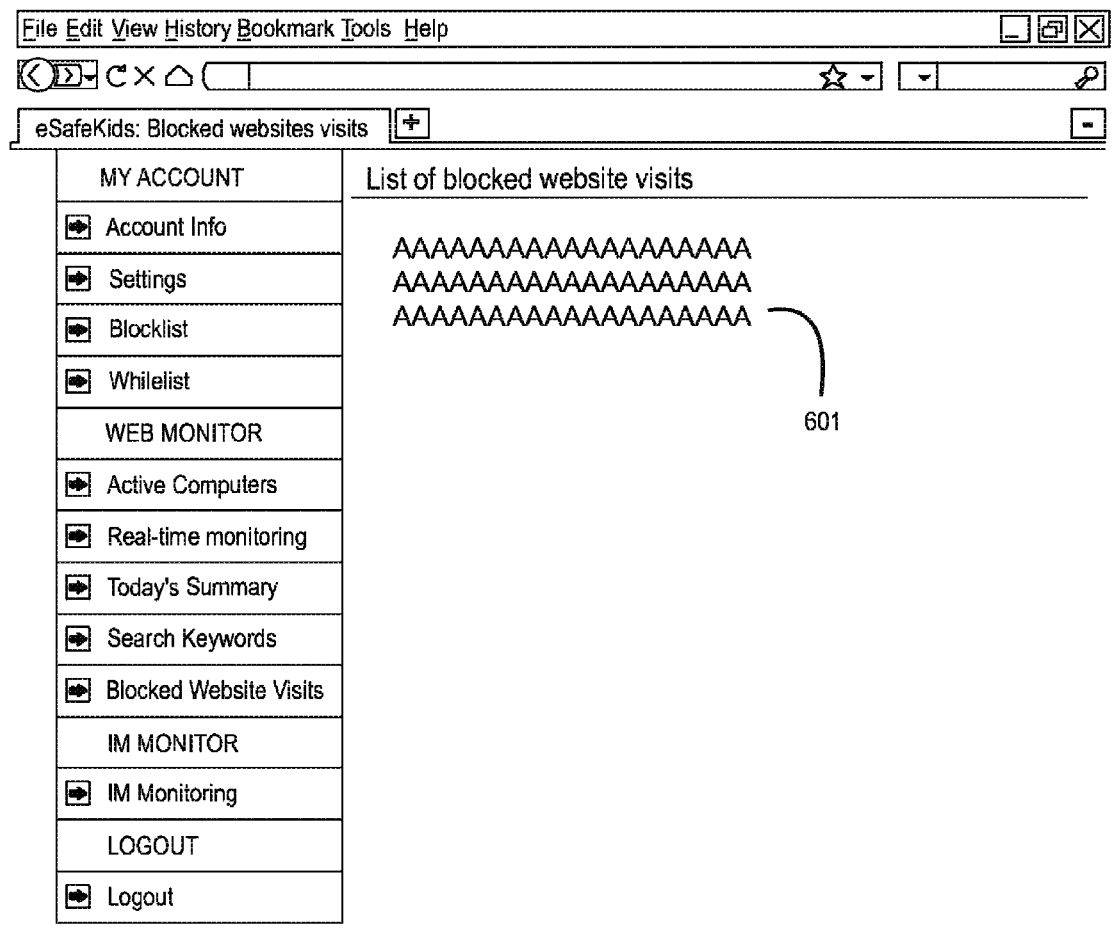
FIG. 6 is a sample screenshot of list of blocked website visits.

FIG. 6 is a sample screenshot of list of blocked website visits. The blocked websites 601 data shows a list of blocked websites visited. The appliance may allow blocked websites visits and only log the unauthorized visits are the appliance may block the transmission of data between the blocked website and the user computer. The appliance is between the router and user computer and therefore can refuse to proxy, transmit data, or otherwise allow connection between a blocked website and the user computer FIG. 7 is a sample screenshot of the account information page. The account information may include a first name, a last name and e-mail. The account information may further include a device ID or a username. A user may have the option to edit these settings through the web interface.

Figure 8:
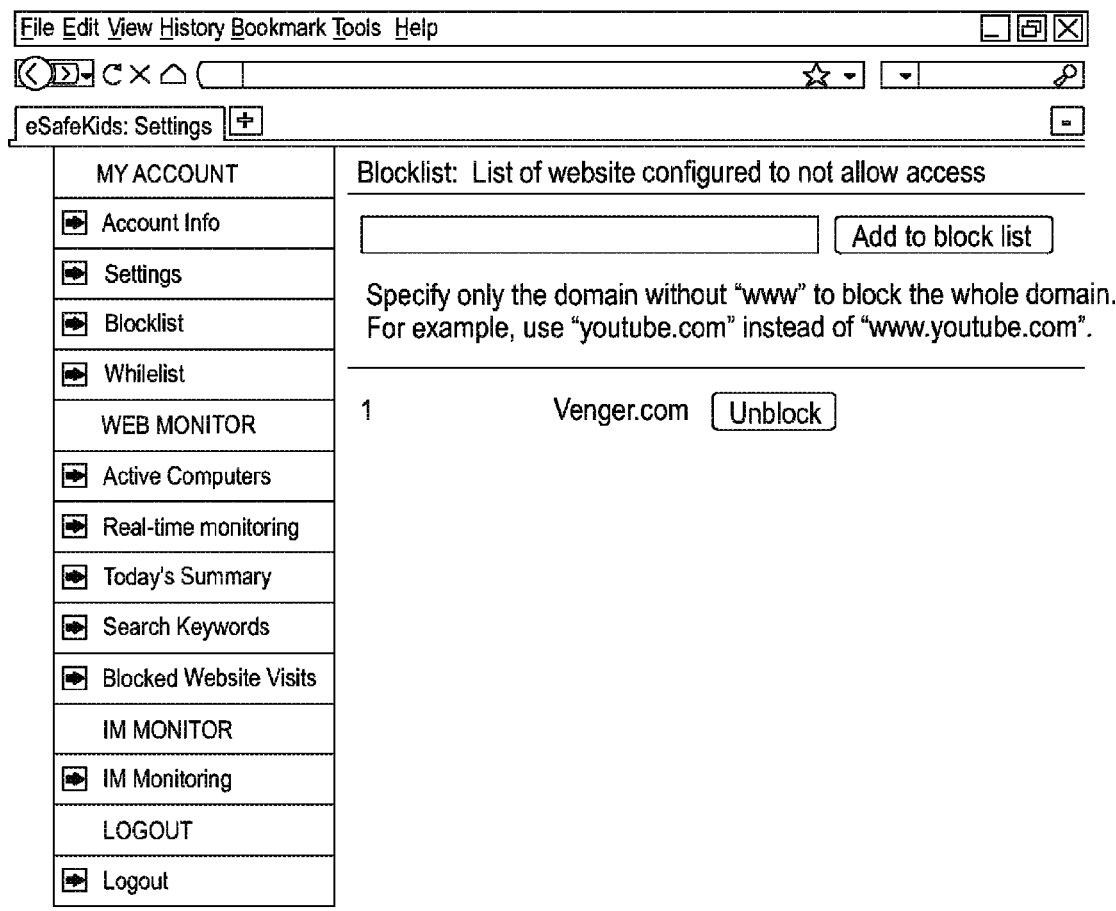
FIG. 8 is a sample screenshot of the white list and block list page.

FIG. 8 is a sample screenshot of the white list and block list page. A user may block or unblock a website by clicking on the block list or white list on the menu navigation buttons. The blocking and unblocking of the websites allows a user to configure the user account on the server so that the server will configure the appliance remotely.

Although the invention has been disclosed in detail with reference only to the preferred embodiments, those skilled in the art will appreciate that various other embodiments can be provided without departing from the scope of the invention. Accordingly, the invention is defined only by the claims set forth below.

The invention claimed is:

1. A method of filtering outbound Internet traffic to remote servers from an end user terminal on a network, the method comprising:
    physically connecting an appliance to the network in a wired or wireless manner, wherein the network includes the end user terminal and a router;
    responsive to physical connection to the network, altering a flow of network traffic from the end user terminal to the router by issuing a gratuitous ARP packet from the appliance to direct the end user terminal to route outbound Internet traffic through the appliance instead of the router;
    receiving, with the appliance, outbound Internet traffic to remote servers from the end user terminal;
    filtering, with the appliance, outbound Internet traffic to form allowed packets for the remote servers;
    forwarding the allowed packets to the remote servers; and
    repeatedly sending, with the appliance, subsequent gratuitous ARP packets, wherein the subsequent gratuitous ARP packets direct the end user terminal to continue to route outbound Internet traffic through the appliance instead of the router.

2. The method of claim 1, wherein the repeatedly sending subsequent gratuitous ARP packets includes sending subsequent gratuitous ARP packets at a regular interval.

3. The method of claim 1, wherein the repeatedly sending subsequent gratuitous ARP packets includes sending subsequent gratuitous ARP packets more frequently than once every minute.

4. The method of claim 1, wherein each subsequent gratuitous ARP packet includes an IP address of the router and a MAC address of the appliance.

5. The method of claim 1, wherein the gratuitous ARP packet includes an IP address of the router and a MAC address of the appliance.

6. The method of claim 1, further comprising responding, with the appliance, to an ARP Request on an IP address of the router by issuing a responsive ARP packet from the appliance, wherein the responsive ARP packet directs the end user terminal to continue to route outbound Internet traffic through the appliance instead of the router.

7. The method of claim 1, wherein the gratuitous ARP packet is an ARP-RESPONSE packet.

8. The method of claim 1, wherein the network includes a plurality of end user terminals and wherein the altering includes directing all of the plurality of end user terminals to send outbound Internet traffic to the appliance instead of the router.

9. The method of claim 1, wherein the physically connecting the appliance to the network is responsive to powering up the appliance.

10. The method of claim 1, wherein the filtering includes proxying at least one of web packets, IM packets, and DNS queries.

11. The method of claim 1, wherein the filtering includes logging TCP activities.

12. The method of claim 1, wherein the filtering includes logging IP addresses and port numbers of the remote servers.

13. The method of claim 1, wherein the filtering includes enforcing at least one of a domain blacklist, a URL blacklist, a domain whitelist, and a URL whitelist.

14. An appliance for filtering outbound Internet traffic to remote servers from an end user terminal on a network, the appliance programmed to:
    physically connect the appliance to the network in a wired or wireless manner, wherein the network includes the end user terminal and a router;
    alter, responsive to physical connection to the network, a flow of network traffic from the end user terminal to the router by issuing a gratuitous ARP packet from the appliance to direct the end user terminal to route outbound Internet traffic through the appliance instead of the router;
    receive, with the appliance, outbound Internet traffic to remote servers from the end user terminal;
    filter, with the appliance, outbound Internet traffic to form allowed packets for the remote servers;
    forward the allowed packets to the remote servers; and repeatedly send, with the appliance, subsequent gratuitous ARP packets, wherein the subsequent gratuitous ARP packets direct the end user terminal to continue to route outbound Internet traffic through the appliance instead of the router.

15. The appliance of claim 14, wherein the appliance is programmed to repeatedly send the subsequent gratuitous ARP packets more frequently than once every minute.

16. The appliance of claim 14, wherein the appliance is programmed to respond to an ARP Request on an IP address of the router by issuing a responsive ARP packet from the appliance, wherein the responsive ARP packet directs the end user terminal to continue to route outbound Internet traffic through the appliance instead of the router.

17. The appliance of claim 14, wherein the gratuitous ARP packet is an ARP-RESPONSE packet.

18. The appliance of claim 14, wherein the network includes a plurality of end user terminals and wherein the appliance is programmed to direct all of the plurality of end user terminals to send outbound Internet traffic to the appliance instead of the router.

19. The appliance of claim 14, wherein the appliance is programmed to repeatedly send the subsequent gratuitous ARP packets at a regular interval.

20. The appliance of claim 14, wherein the appliance is programmed to physically connect the appliance to the network, in a wired or wireless manner, responsive to powering up the appliance.

* * * * *